(12) United States Patent
Powell

(10) Patent No.: US 9,373,354 B2
(45) Date of Patent: *Jun. 21, 2016

(54) METHOD AND SYSTEM FOR PREVENTING UNRELIABLE DATA OPERATIONS AT COLD TEMPERATURES

(71) Applicant: Dell Products L.P., Round Rock, TX (US)

(72) Inventor: Clinton Allen Powell, Austin, TX (US)

(73) Assignee: Dell Products L.P., RoundRock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/525,677

(22) Filed: Oct. 28, 2014

(65) Prior Publication Data

US 2015/0043103 A1   Feb. 12, 2015

Related U.S. Application Data

(63) Continuation of application No. 13/623,605, filed on Sep. 20, 2012.

(51) Int. Cl.
| | | |
|---|---|---|
| G11B 19/04 | (2006.01) | |
| G11B 5/55 | (2006.01) | |
| G11B 25/04 | (2006.01) | |
| G11B 33/14 | (2006.01) | |

(52) U.S. Cl.
CPC ............ *G11B 19/046* (2013.01); *G11B 5/5547* (2013.01); *G11B 5/5565* (2013.01); *G11B 25/043* (2013.01); *G11B 33/1406* (2013.01)

(58) Field of Classification Search
None
See application file for complete search history.

(56) References Cited

U.S. PATENT DOCUMENTS

| | | | |
|---|---|---|---|
| 6,055,120 A | 4/2000 | Schirle | 360/73.03 |
| 6,078,158 A | 6/2000 | Heeren et al. | 318/430 |
| 6,169,930 B1 | 1/2001 | Blachek et al. | 360/75 |
| 6,735,035 B1 | 5/2004 | Smith et al. | 360/69 |
| 6,865,506 B1 | 3/2005 | Escobar et al. | 702/130 |
| 6,898,041 B2 | 5/2005 | Sakamoto | 360/73.03 |
| 6,934,107 B2 | 8/2005 | Escobar et al. | 360/69 |
| 7,005,820 B2 | 2/2006 | Tanner | 318/471 |
| 7,009,354 B2 | 3/2006 | Tanner | 318/471 |
| 7,136,247 B2 | 11/2006 | Escobar et al. | 360/75 |
| 7,203,021 B1 | 4/2007 | Ryan et al. | 360/75 |
| 7,397,629 B1 | 7/2008 | Hertzberg | 360/78.04 |
| 7,450,334 B1 * | 11/2008 | Wang et al. | 360/75 |
| 7,549,065 B2 | 6/2009 | Schutte | 713/300 |
| 7,706,929 B2 | 4/2010 | Chiu | 700/300 |
| 7,813,072 B2 | 10/2010 | Son et al. | 360/69 |
| 2008/0130166 A1 | 6/2008 | Auerbach et al. | 360/97.02 |
| 2011/0302352 A1 | 12/2011 | Lee et al. | |
| 2013/0080679 A1 | 3/2013 | Bert | |

FOREIGN PATENT DOCUMENTS

JP   2001057010   2/2001

* cited by examiner

*Primary Examiner* — Wayne Young
*Assistant Examiner* — James L Habermehl
(74) *Attorney, Agent, or Firm* — Baker Botts L.L.P.

(57) ABSTRACT

Systems and methods for reducing problems and disadvantages associated with protecting data during cold excursions are provided. A method for preventing unreliable data operations at cold temperatures may include determining whether a first internal temperature of a hard disk drive (HDD) is below a threshold temperature. The method may also include initiating an artificial seek operation if the first internal temperature is below the threshold temperature.

27 Claims, 5 Drawing Sheets

METHOD AND SYSTEM FOR PREVENTING UNRELIABLE DATA OPERATIONS AT COLD TEMPERATURES

CROSS-REFERENCE TO RELATED APPLICATIONS

The present application is a continuation of co-pending U.S. patent application Ser. No. 13/623,605 filed Sep. 20, 2012, and which is hereby incorporated by reference in its entirety for all purposes.

TECHNICAL FIELD

The present disclosure relates in general to information handling systems, and more particularly to a method and system for preventing unreliable data operations at cold temperatures.

BACKGROUND

As the value and use of information continues to increase, individuals and businesses seek additional ways to process and store information. One option available to users may be information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information may be handled, how the information may be handled, how much information may be processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications.

In addition, information handling systems may include a variety of hardware and/or software components that may be configured to process, store, and/or communicate information and may include one or more computer systems, data storage systems, and/or networking systems. In order to process, store and manage the information, a hard disk drive or solid state drive may be included in the information handling system. As information handling systems become more compact and complex, various issues have occurred.

One type of information handling system may be a server, which may be a processor-based network device that may manage network resources. As examples, a file server may be dedicated to storing files, a print server may manage one or more printers, a network server may manage network traffic, and a database server may process database queries. A Web server may service Internet World Wide Web pages.

A server may be implemented as a "stand alone" or monolithic server in which a single chassis contains a single set of processing resources and an associated set of I/O resources. A multiprocessor monolithic server may, for example, include two or more processors that share access to a common system memory and a common set of peripheral devices including persistent storage resources, network interface resources, graphical display resources, and so forth. In other implementations, some of the I/O resources available to the server may be provided as external components. Persistent storage, for example, may be provided to a monolithic server as an external box.

In more recent years, servers may have been implemented as "blade servers." Blade servers may be so named because they employ server blades, which are thin, modular electronic circuit boards containing one or more microprocessors, memory, and/or other server hardware and/or firmware. Blade servers, which may sometimes be referred to as a high-density servers, typically include a space saving, rack-based chassis that may accept multiple server blades. Blade servers may be often used in clusters of servers dedicated to a single task. For example, a blade server may function as a web server by servicing web-based requests addressed to one or more universal resource locators (URLs). In this implementation, the blade server may route individual requests to different server blades within the blade server based on factors including the current loading of individual blades and the locality of information required to respond to a request, all in a manner that may be invisible to the user.

Servers may be sometimes arranged in data centers where power management and power conservation may be an increasingly important consideration. Server components generate heat that may be dissipated to maintain performance parameters as well as the electrical and mechanical integrity of the server. Traditional thermal management efforts may have focused on reducing temperature of the data center in order to cool the server components. As part of these efforts, servers may increasingly be located in geographies with climate characteristics conducive to reducing temperatures. As data centers become colder, storage as part of or used with a server or a server blade may begin operation before it reaches a threshold temperature that may ensure the ensuing reads/writes are reliable. This may result in errors in data storage, management and/or communications.

SUMMARY

In accordance with the teachings of the present disclosure, disadvantages and problems associated protecting data during cold excursions may be substantially reduced or eliminated.

In accordance with one embodiment of the present disclosure, a method for preventing unreliable data operations at cold temperatures may include determining whether a first internal temperature of a hard disk drive (HDD) is below a threshold temperature. The method may also include initiating an artificial seek operation if the first internal temperature is below the threshold temperature.

In accordance with another embodiment of the present disclosure, a HDD may include a temperature sensor configured to transmit a signal corresponding to a first internal temperature. The HDD may also include a component configured to perform an artificial seek operation if the signal indicates that the first internal temperature is below a threshold temperature.

In accordance with another embodiment of the present disclosure, an information handling system may include a processor and a HDD communicatively coupled to the processor. The information handling system may further include a computer-readable medium communicatively coupled to the processor and having stored thereon instructions configured to, when executed by the processor, determine whether a first internal temperature of the HDD is below a threshold temperature. The instructions may also be configured to initiate an artificial seek if the first internal temperature is below the threshold temperature.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1-6, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage resource, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

Figure 1:
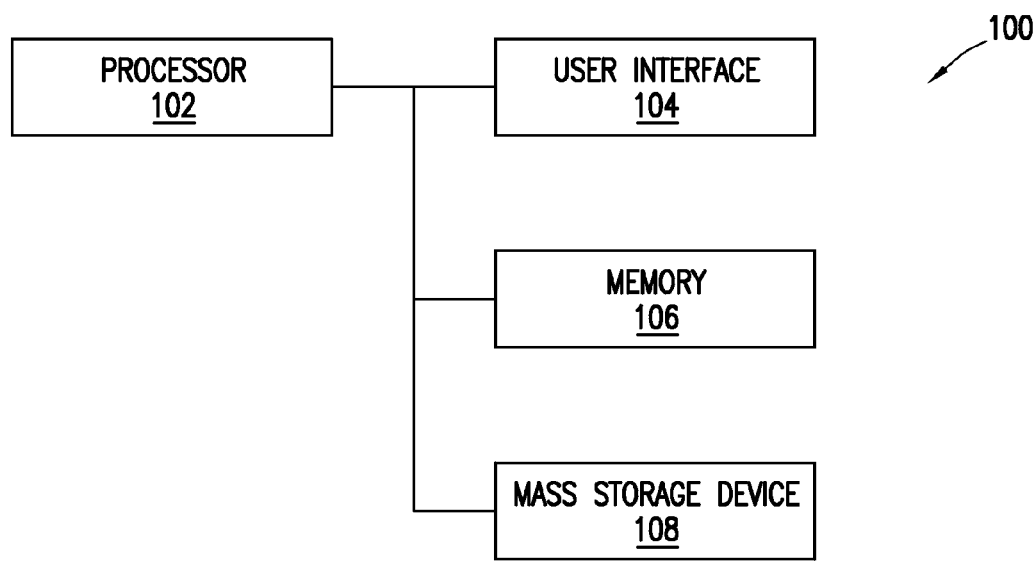
FIG. 1 illustrates a block diagram of an example information handling system, in accordance with certain embodiments of the present disclosure.

FIG. 1 illustrates a block diagram of an example information handling system (HIS) 100, in accordance with certain embodiments of the present disclosure. IHS 100 may generally be operable to receive data from, and/or transmit data to, other IHSs 100. In one embodiment, IHS 100 may be a personal computer adapted for home use. In the same or alternative embodiments, IHS 100 may be a personal computer adapted for business use. In the same or alternative embodiments, IHS 100 may be a storage array configured to include multiple storage resources (e.g., hard drives) in order to manage large amounts of data. In some embodiments, IHS 100 may include processor 102, user interface 104, memory 106, and/or mass storage device 108.

Processor 102 may comprise any system, device, or apparatus operable to interpret and/or execute program instructions and/or process data. Processor 102 may include, without limitation, a microprocessor, microcontroller, digital signal processor (DSP), application specific integrated circuit (ASIC), or any other digital or analog circuitry configured to interpret and/or execute program instructions and/or process data. In embodiments of the present disclosure, processor 102 may interpret and/or execute program instructions and/or process data stored in memory 106, mass storage device 108, and/or another component of IHS 100.

User interface 104 may be communicatively coupled to processor 102 and may include any instrumentality or aggregation of instrumentalities by which a user may interact with IHS 100. For example, user interface 104 may permit a user to input data and/or instructions into IHS 100 (e.g., via a keyboard, pointing device, and/or other suitable means), and/or otherwise manipulate IHS 100 and its associated components. User interface 104 may also permit IHS 100 to communicate data to a user, e.g., by means of a display device.

Memory 106 may be communicatively coupled to processor 102 and may comprise any system, device, or apparatus operable to retain program instructions or data for a period of time (e.g., computer-readable media). Memory 106 may comprise random access memory (RAM), electrically erasable programmable read-only memory (EEPROM), a PCM-CIA card, flash memory, magnetic storage, opto-magnetic storage, or any suitable selection and/or array of volatile or non-volatile memory that retains data after power to IHS 100 may be turned off.

Mass storage device 108 may include one or more storage resources (or aggregations thereof) communicatively coupled to processor 102 and may include any system, device, or apparatus operable to retain program instructions or data for a period of time (e.g., computer-readable media). Mass storage device 108 may retain data after power to IHS 100 may be removed. Mass storage device 108 may include one or more hard disk drives (HDDs), magnetic tape libraries, optical disk drives, magneto-optical disk drives, compact disk drives, compact disk arrays, disk array controllers, solid state drives (SSDs), and/or any computer-readable medium operable to store data.

In some embodiments of the present disclosure, IHS 100 may be located in a data center with other IHSs. Because components of IHS 100 generate significant amounts of heat during operation, a data center may be designed to maintain a relatively cold ambient air temperature, e.g., 5° C., to ensure reliability. The relatively cold ambient air temperature may cause IHS 100 to also experience approximately the same cold temperature, particularly at start-up of IHS 100. Further, to accomplish the relatively cold ambient air temperatures, data centers may be geographically located such that the temperature experienced by IHS may be as low as approximately −5° C. or −10° C. Design specifications for components of IHS 100 may not encompass these relatively cold temperatures.

For example, mass storage device 108, such as a HDD, may be designed for a temperature range from approximately 5° C. to approximately 60° C. A HDD operating at temperatures below the rating temperature, e.g., −10° C., may not allow the HDD disk pack to reach the target revolutions per minute (RPM). A HDD that may not reach the target RPM may prevent the heads from loading onto the media. IHS 100 may view this situation as a failed power and/or spin up, but the data on the HDD may not be compromised. Further, at temperatures below the rating temperature, e.g., −10° C. to 5° C., the HDD disk pack may slowly spin up to the target RPM. During the spin up process at below rating temperatures, reads from or writes made to the HDD may be compromised as discussed in more detail below with reference to FIGS. 3-5.

In some embodiments of the present disclosure, mass storage device 108 may include a solid state drive (SSD). A SSD may be communicatively coupled to processor 102, and may include any system, device, or apparatus configured to retain program instructions or data for a period of time (e.g., a computer-readable medium) which includes solid-state memory as a storage medium (e.g., flash memory). A SSD may include a controller communicatively coupled to processor 102. A controller may include any system, device, or apparatus configured to manage and/or control an SSD and its various components. For example, in some embodiments, a controller may be configured to read data from and/or write data to a flash memory included in a SSD. In such embodiments, a controller may perform reads and writes and may translate virtual logical block addresses (LBAs) of a SSD to physical LBAs of a flash memory.

A flash memory may be communicatively coupled to a controller and may include a non-volatile storage medium that utilizes flash-based storage media and/or similar storage media. In some embodiments, a flash memory may comprise NAND flash memory. A flash memory may store information associated with input/output operations to a SSD (e.g., data, instructions, or other information subject to write operations to a SSD and/or data, instructions, and/or other information responsive to read operations to a SSD).

Additionally, a SSD may be coupled and/or placed near to a thermistor, sensor, or other suitable temperature measuring unit to measure a temperature. The thermistor, sensor, or other suitable temperature measuring unit may generate a voltage signal corresponding to the temperature on or near the SSD and may be configured to transmit a generated voltage signal to the controller and/or processor 102.

In embodiments of the present disclosure, a SSD may have a designed operating temperature range. For example, the operating range, or rated temperature range, may be from approximately 0° C. to approximately 70° C. In embodiments of the present disclosure, a SSD may be operating in a data center that experiences a temperature drop from within the rated temperature range for a SSD to a temperature below the rated temperature range. For example, the temperature in the data center may drop from approximately 5° C. to approximately −5° C. Additionally, a SSD may be in IHS 100 that may be being power cycled and/or powered up in a data center that may be experiencing temperatures below the rated temperature range, e.g., below approximately 5° C. Any attempt to read from or write to a SSD under these conditions may not be reliable or successful.

Consequently, in embodiments of the present disclosure, attempts to read actual data from or write actual data to a SSD while the SSD may be below the rated temperature may be unreliable. Thus, at temperatures below the rated temperature range, writing actual data to and reading actual data from the SSD may be paused until the temperature of the SSD rises to the rated temperature range. Therefore, introducing "dummy" SSD controller transactions, artificial R/W operations, and/or other activities that may produce heat from the SSD before the temperature of the SSD reaches the rated temperature, may cause the SSD to heat up quickly and may protect actual data. The reading or writing of actual data may be paused or withheld until the SSD may be at or above the rated temperature.

In some embodiments of the present disclosure, multiple types of procedures may be utilized for the artificial R/W operations on the SSD. For example, sequential writing may be employed to simulate the SSD programming/erasing LBAs in sequence. As another example, random reading may be employed to simulate the SSD accessing random LBAs. As discussed below with reference to FIG. 3, the types of artificial R/W operations employed by the SSD and the artificial seeks utilized by a HDD may be similar in concept, however the implementation on different types of mass storage device 108 may be different.

Figure 2:
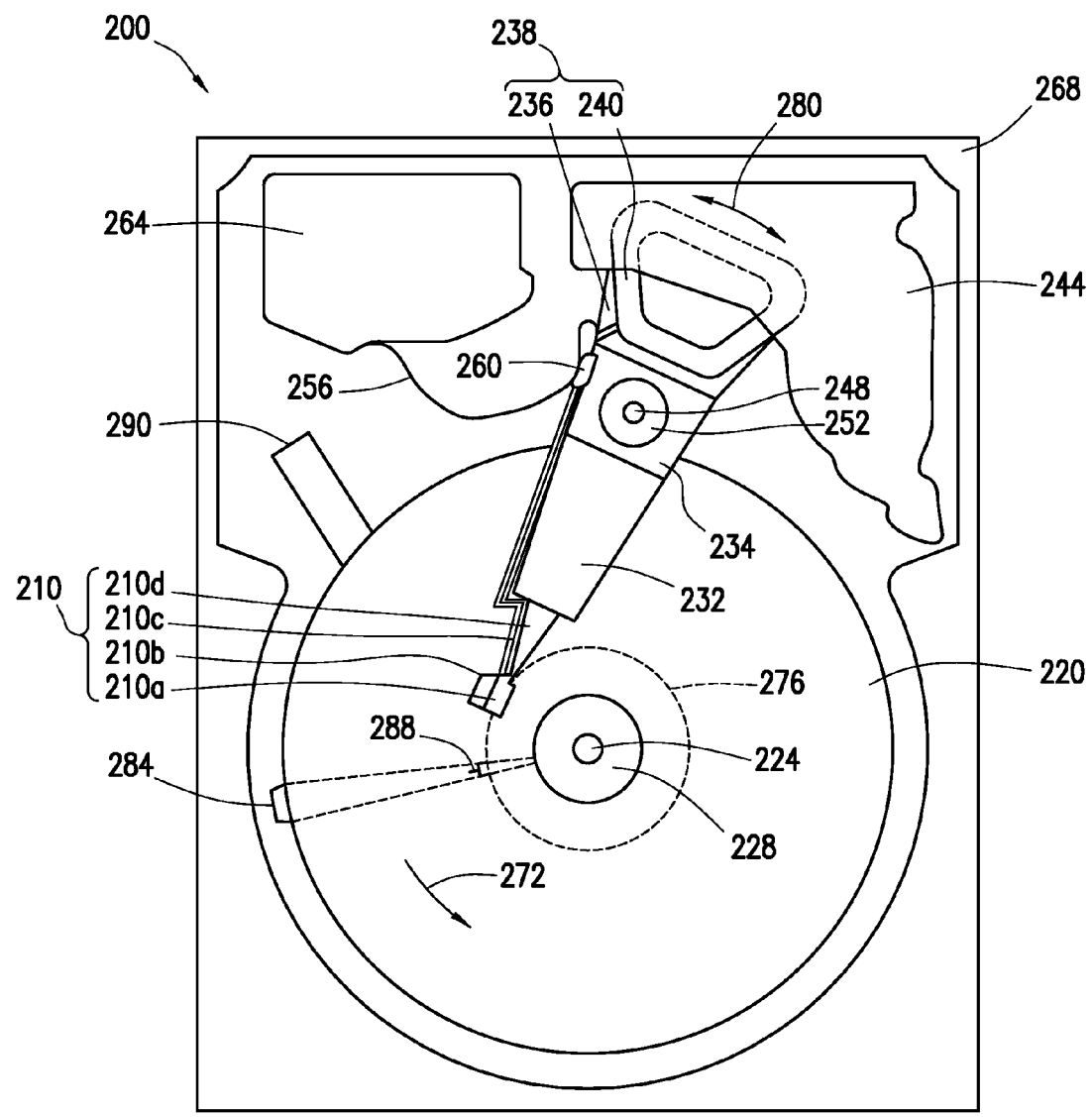
FIG. 2 illustrates an example hard disk drive (HDD), in accordance with certain embodiments of the present disclosure.

FIG. 2 illustrates an example HDD 200, in accordance with certain embodiments of the present disclosure. FIG. 2 illustrates one potential arrangement of components of HDD 200. HDD 200 may include at least one head-gimbal assembly (HGA) 210 that may include magnetic-recording head 210a, also called "head," lead suspension 210c coupled to head 210a, and load beam 210d coupled to slider 210b. In some embodiments, slider 201b may include head 210a.

In some embodiments, HDD 200 may also include at least one magnetic-recording disk 220, or "disk," rotatably coupled to spindle 224 and a drive motor, also called a spindle motor (SPM), coupled to spindle 224 for rotating disk 220. Head 210a may include a write element, or "writer," and a read element, or "reader," for respectively writing and reading information stored on disk 220 of HDD 200. One or more disks 220 may be coupled to spindle 224 via clamp 228. Disk 220 may include a thin magnetic-recording medium on a surface facing head 210a. Information may be recorded in the thin-magnetic recording medium.

In some embodiments, HDD 200 further may include arm 232 coupled to HGA 210, carriage 234, and/or voice-coil motor (VCM) 238. VCM 238 may include armature 236 with voice coil 240. Stator 244 may include a voice-coil magnet. Armature 236 may be coupled to carriage 234. Armature 236 may be configured to move arm 232 and HGA 210 to access portions of one or more disks 220. Armature 236, carriage 234, and arm 232 may be mounted on pivot-shaft 248 with an interposed pivot-bearing assembly 252.

In some embodiments of the present disclosure, signals may be provided by flexible cable 256. Signals may include current to voice coil 240 and/or write signals to and read signals from head 210a. Interconnection between flexible cable 256 and head 210a may be provided by arm-electronics (AE) module 260. AE module 260 may include an on-board pre-amplifier for the read signal and/or other read-channel and write-channel electronic components. Flexible cable 256 may also be coupled to electrical-connector block 264. Electrical-connector block 264 may provide electrical communication through electrical feedthroughs provided by housing 268. Housing 268, which may also be referred to as a "casting," in conjunction with an HDD cover may provide a sealed, protective enclosure for some or all of the components of HDD 200.

Other components may be arranged in electrical-connector block 264, e.g., a disk controller, servo electronics, and/or a digital-signal processor (DSP). Other components may provide signals to the SPM, voice coil 240, VCM 238, and/or head 210a. For example, components may include a disk controller coupled to a VCM driver that may supply drive current to VCM 238 to control the movement of head 210a. A disk controller may also be coupled to a SPM driver that may supply drive current to the SPM to control rotation of disk 220. Further, a disk controller may be coupled to head 210a via a read/write (R/W) channel and/or a pre-amplifier. A disk controller may be a digital signal processor (DSP), a microprocessor, or a microcontroller, and may be embodied by software and/or firmware. Components may also include memory such that data and/or commands from the disk controller and/or from processor 102 to execute computer-readable instructions may be stored.

The R/W channel may be utilized to convert an analog signal read by head 210a and amplified by a pre-amplifier to a signal read by a disk controller, processor 102, and/or other suitable component via a host interface through electrical feedthroughs provided by housing 268. The R/W channel may output a converted signal to a disk controller, processor 102, and/or other suitable component. Also, when data received from processor 102 through a host interface in a write mode, the data may be converted so that a write signal may be output to the pre-amplifier. The pre-amplifier may convert the write signal to a write current to be output through head 210a. Thus, a disk controller, processor 102, and/or other suitable component may supply a control signal to the R/W channel to read data from disk 220 or to write data to disk 220.

Additionally, HDD 200 may include a thermistor or other temperature measurement unit to measure an internal temperature. The thermistor may generate a signal associated with the internal temperature of HDD 200. The thermistor may be configured to transmit the signal to a disk controller, processor 102, and/or other suitable component.

Since the internal temperature of HDD 200 may affect the performance or reliability of HDD 200, a disk controller, processor 102, and/or other suitable component may measure the internal temperature of HDD 200 using the thermistor or other temperature measurement unit. Further, a disk controller, processor 102, and/or other suitable component may adjust various parameters of HDD 200 according to the temperature measurement to improve performance and reliability of HDD 200 according to temperature.

The signal provided to the SPM may enable the SPM to spin, providing torque to spindle 224, which may be in turn transmitted to disk 220. As a result, disk 220 may spin in a direction 272. Spinning disk 220 may create a cushion of air on the surface of disk 220 facing head 210a. The cushion of air may act as an air-bearing on which an air-bearing surface (ABS) of slider 210b rides. Thus, slider 210b may move over the surface of disk 220 without making contact with the thin magnetic-recording medium of disk 220. The signal that may be provided to voice coil 240 and/or VCM 238 may enable head 210a to access track 276 on which information may be recorded. Thus, armature 236 may swing through arc 280 and may enable HGA 210 to access various tracks on disk 220. Head 210a may rest on load/unload platform 290 when head 210a may not be in use.

In some embodiments, information may be stored on disk 220 in a plurality of concentric tracks arranged in sectors on disk 220, for example, sector 284. Correspondingly, each track may be composed of a plurality of sectored track portions, for example, sectored track portion 288. Each sectored track portion 288 may be composed of recorded data and a header. The header may include a servo-burst-signal pattern, information that identifies track 276, and/or error correction code information. In accessing track 276, the read element of head 210a may read the servo-burst-signal pattern which provides a position-error-signal (PES) to the servo electronics. The PES may control the electrical signal provided to voice coil 240 enabling head 210a to follow track 276. Upon finding track 276 and identifying a particular sectored track portion 288, head 210a may either read data from track 276 and/or write data to track 276 depending on instructions received from a disk controller and/or processor 102 as described in more detail above with reference to FIG. 1.

Figure 3:
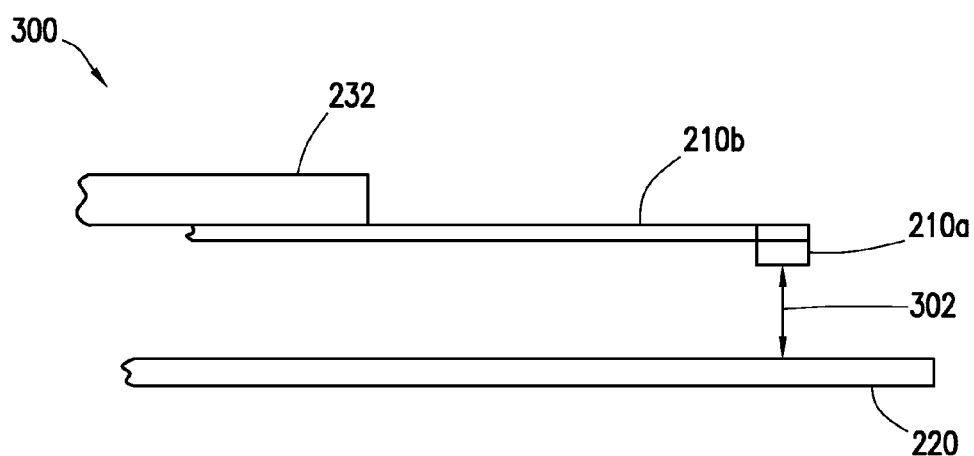
FIG. 3 is an example side view of portions of the HDD, in accordance with certain embodiments of the present disclosure.

FIG. 3 is an example side view of portions of HDD 200, in accordance with certain embodiments of the present disclosure. As described in more detail above with reference to FIG. 2, spinning disk 220 may create a cushion of air such that the ABS of slider 210b may move above the surface of disk 220 without contacting the surface, or fly over the surface. Thus, the corresponding distance between the surface of disk 220 and the head 210a may be referred to as "fly height" 302.

Fly height 302 may be affected by temperature, humidity, and/or altitude. For example, at a higher temperature, the size of the air cushion may decrease such that fly height 302 may decrease. As another example, at a lower temperature, the size of the air cushion may increase such that fly height 302 may increase. Thus, at lower temperatures, head 210a may be further away from the surface of disk 220. As fly height 302 increases, write signals sent from head 210a to disk 220 may experience distortion and inaccuracies such that the information written to disk 220 may be unreliable. Thus, HDD 200 may have a rated temperature range that may ensure reliable read or write operations. For example, HDD 200 may have a rated temperature range of approximately 5° C. to approximately 60° C. Consequently, operation of HDD 200 at temperatures below the rated temperature may compromise the integrity of reads from or writes to disk 220.

In some embodiments of the present disclosure, HDD 200 may be operating in a data center that experiences a temperature drop from within the rated temperature range for HDD 200 to a temperature below the rated temperature range. For example, the temperature in the data center may drop from approximately 5° C. to approximately −5° C. The spinning of one or more disks 220 around spindle 224 by the SPM may generate sufficient heat to keep the temperature of HDD 200 within the rated temperature range, e.g., at or above approximately 5° C. Further, operation of VCM 238 may provide additional heat as VCM 238 pivots HGA 210 to allow head 210a to find the appropriate particular sectored track portion 288 for the read or write operation.

However, the SPM and VCM 238 may only operate if a disk controller, processor 102, and/or other suitable source sends R/W commands to HDD 200. If HDD 200 experiences no R/W commands, then HDD 200 may drop into a low power state, e.g., idle or standby state. In a low power state, the SPM and VCM 238 may also be idle and/or the SPM may be spinning disk 220 down at a below target RPM. Thus, HDD 200 may thermally stabilize to a temperature below the rated temperature.

The time elapsed from the time HDD 200 may be powered on until HDD 200 may be ready, and/or disks 220 are spinning at approximately the target RPM, and/or HDD 200 may be at approximately the target temperature, may be called the "time to ready." In typical operation, time to ready may be only a few seconds, e.g., approximately 10-12 seconds.

In some embodiments of the present disclosure, HDD 200 may be part of IHS 100 that may be power cycled and/or powered up in a data center that may be experiencing temperatures below the rated temperature range, e.g., below approximately 5° C. An attempt to read from or write to HDD 200 under this condition may not be reliable or successful. Consequently, in some embodiments of the present disclosure, attempts to read data from or write data to disk 220 while HDD 200 may be below the rated temperature may be unreliable. However, operation of the SPM to spin disk 220, operation of VCM 238 to pivot HGA 210, and/or operation of a heat producing component may generate heat that may warm HDD 220 to the rated temperature.

The SPM may operate to spin disk 220 up to the target RPM in normal operation after power may be provided to HDD 200. However, VCM 238 may not operate to pivot HGA 210 without the input of R/W commands, or "seeks." Therefore, by introducing "dummy" or artificial seeks during the start up process, VCM 238 may operate to pivot HGA 210 without actually reading or writing data. The reading or writing of data may be paused, suspended, or withheld until HDD 200 may be at or above the rated temperature.

In some embodiments of the present disclosure, multiple types of seeking procedures may be utilized for the artificial seeks. For example, sequential seeking may be employed that may cause head 210a to read tracks in sequence. A ⅓ stroke seek may also be utilized. A ⅓ stroke seek may be a fixed length seek that may approximate ⅓ of a full stroke. As another example, random seeking may be used that may seek random particular sector track portions. Yet another example may be butterfly seeking in which tracks between seeks may begin at a few and the number of track between seeks becomes larger.

In some embodiments of the present disclosure, a broader temperature range than the rated temperature range, described in more detail above with reference to FIG. 3, may be defined for HDD 200. A broader temperature range may allow read and write operations to occur according to demands of a specific implementation. A manufacturer, user, administrator, operator and/or other suitable source may utilize a user interface and/or computer-readable media, including software and/or firmware, to specify an operating range. The specified operating range may allow HDD 200 to begin reading or writing actual data before HDD 200 reaches the rated temperature range. Additionally, HDD 200 may store, define, and/or utilize multiple temperature ranges.

As described in more detail above with reference to FIG. 2, a thermistor, sensor, or other temperature measuring unit may be configured to measure the internal temperature of HDD 200. In some embodiments of the present disclosure, the frequency of measuring temperature, polling for temperature, and/or reporting temperature may vary according to demands of a specific implementation. A disk controller, processor 102, and/or other suitable source may poll HDD 200 for temperature information. Polling may occur at user and/or manufacturer defined intervals, may occur continuously, and/or may occur on an event-driven basis, e.g., when a particular temperature may be achieved. Additionally, HDD 200 may measure and/or report temperature information at user and/or manufacturer defined intervals, continuously, and/or on an event-driven basis, e.g., when a particular temperature may be achieved.

Figure 4:
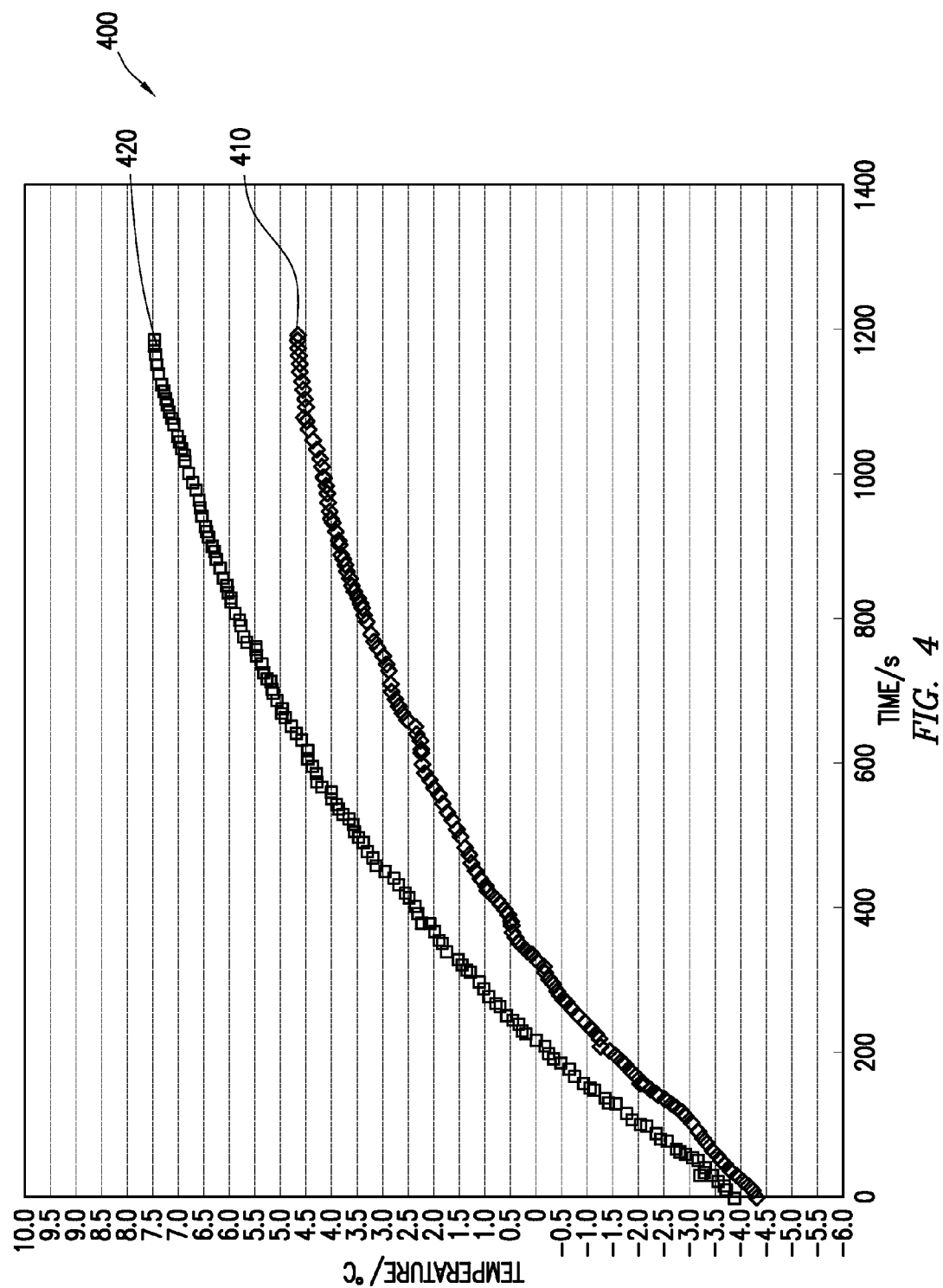
FIG. 4 illustrates a graph of temperature rise of a HDD as a function of time, in accordance with certain embodiments of the present disclosure.

FIG. 4 illustrates a graph 400 of temperature rise of HDD 200 as a function of time, in accordance with certain embodiments of the present disclosure. Graph 400 may begin at a temperature below the rated temperature of HDD 200, e.g., approximately −5° C. Graph 400 illustrates the change in temperature as a function of time for HDD 200, e.g., a 3.5" HDD, that may be heated by the SPM spinning disk 220 (plot 410). Graph 400 also shows the change in temperature as a function of time for HDD 200 that may be heated by both the SPM spinning disk 220 and VCM 238 to pivot HGA 210 using random seeking (plot 420). The time to heat HDD 220 from below the rated temperature to the rated temperature may improve with the addition of random seeking. For example, plot 410 may take more than approximately 20 minutes to warm from approximately −5° C. to approximately 5° C., while plot 420 may take approximately 11 minutes to warm from approximately −5° C. to approximately 5° C.

Figure 5:
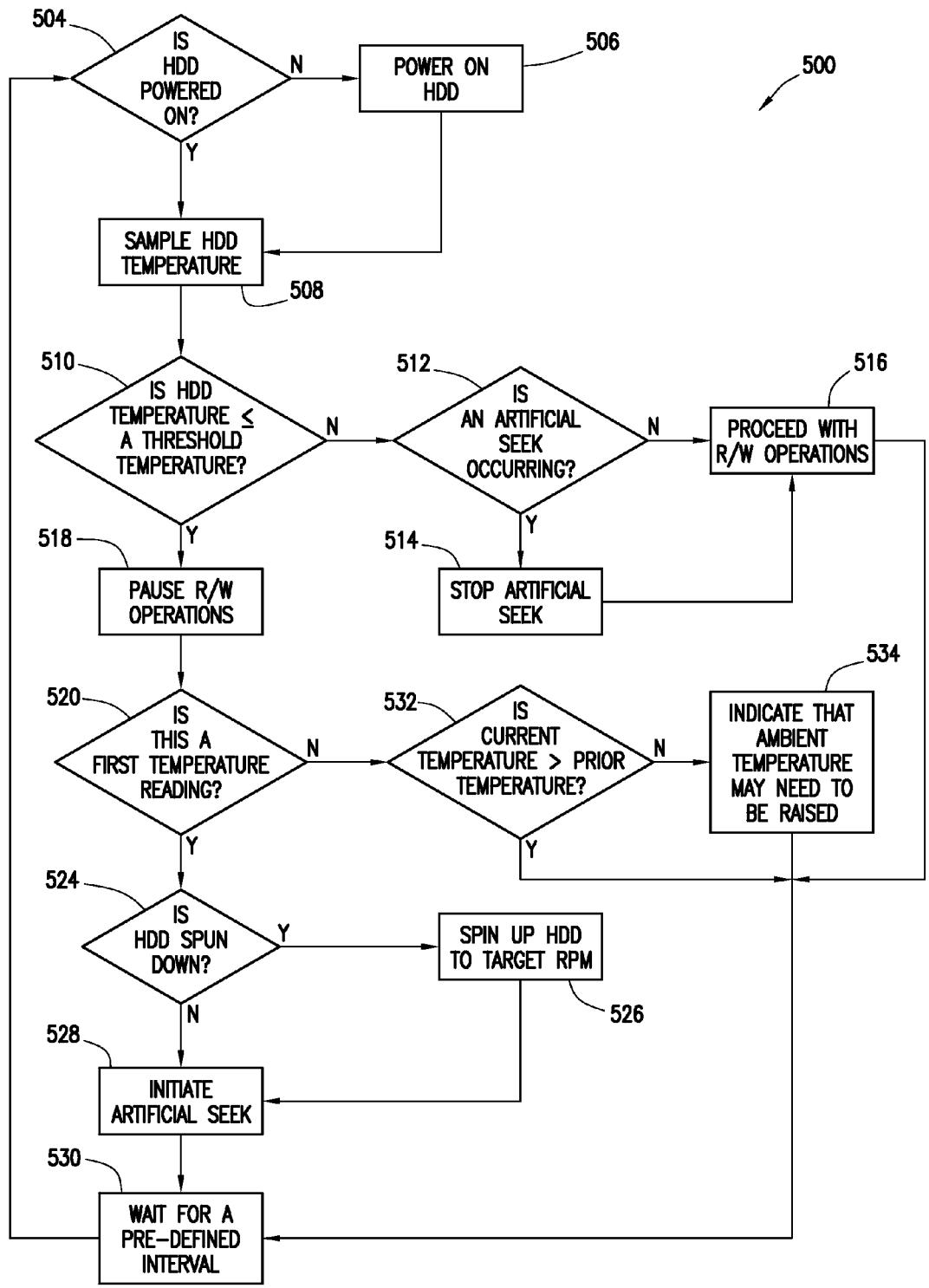
FIG. 5 illustrates a flow chart for an example method for protecting data to be read from or written to a HDD during cold excursions, in accordance with certain embodiments of the present disclosure.

FIG. 5 illustrates a flow chart for an example method 500 for protecting data to be read from or written to HDD 200 during cold excursions, in accordance with certain embodiments of the present disclosure. The steps of method 500 may be performed by various computer programs, models or any combination thereof. The programs and models may include instructions stored on a computer-readable medium and operable to perform, when executed, one or more of the steps described below. The computer-readable media may include any system, apparatus or device configured to store and/or retrieve programs or instructions such as a microprocessor, a memory, a disk controller, a compact disc, flash memory or any other suitable device. The programs and models may be configured to direct a processor or other suitable unit to retrieve and/or execute the instructions from the computer readable media. For example, method 500 may be executed by processor 102, a disk controller, a user, and/or other suitable source. For illustrative purposes, method 500 may be described with respect to HDD 200 of FIGS. 2 and 3; however, method 500 may be used to protect data to be read from or written to any suitable HDD.

Although FIG. 5 discloses a particular number of steps to be taken with respect to method 500, method 500 may be executed with greater or lesser steps than those depicted in FIG. 5. In addition, although FIG. 5 discloses a certain order of steps to be taken with respect to method 500, the steps comprising method 500 may be completed in any suitable order.

At step 504, method 500 may determine if HDD 200 is powered on. If HDD 200 is not powered on, the method may proceed to step 506 where power may be provided to HDD 200. If, or once, HDD 200 may be powered on, method 500 may proceed to step 508.

At step 508, method 500 may sample HDD 200 temperature. A thermistor, sensor, or other suitable temperature measuring unit located in or on HDD 200 may determine and report the internal temperature. The temperature may be sampled automatically according to a schedule as described in more detail above with reference to FIGS. 1-4. Additionally, a user, administrator, manufacturer, and/or other suitable individual may utilize a user interface, such as user interface 102, to initiate a manual sampling of HDD 200 temperature. After sampling the temperature, method 500 may proceed to step 510.

At step 510, method 500 may make a determination whether the sampled HDD temperature is at or above a threshold temperature. The threshold temperature may be based on a design rating for HDD 200 and/or it may be user defined. If HDD 200 sampled temperature is at or above the threshold temperature, method 500 may proceed to step 512. If HDD 200 sampled temperature is below the threshold temperature, then method 500 may proceed to step 518.

At step 512, method 500 may determine if an artificial seek is occurring in HDD 200. Discussed in more detail below, an artificial seek may have been initiated to heat up HDD 200. If an artificial seek is occurring, it may be stopped at step 514. If an artificial seek is not occurring or the artificial seek is stopped at step 514, then method 500 may proceed to step 516.

At step 516, method 500 may instruct HDD 200 to proceed with standard R/W operations such that head 210a may be reading data from and writing data to disk 220 in normal operation. Following step 516, method 500 may proceed to step 530.

If, at step 510, HDD 200 temperature is below a threshold temperature, method 500 may proceed to step 518. At step 518, method 500 may pause or suspend R/W operations that may be processed by HDD 200. The pausing of R/W operations may occur to protect data to be read from or written to disk 220 from being corrupted or rendered unreliable. After step 518, method 500 may proceed to step 520.

At step 520, method 500 may determine if the current temperature reading is a first temperature reading since HDD 200 may have been powered on at step 504. For example, whether the temperature from the thermistor, sensor, or other suitable temperature measuring unit discussed with respect to FIG. 2, was sampled or read for the first time. If the current temperature reading is the first reading, method 500 may proceed to step 524. If the current temperature reading is not a first reading, e.g., a second or subsequent reading, then method 500 may proceed to step 532.

At step 524, method 500 may determine if HDD 200 is spun down such that HDD 200 may be operating at an RPM below a target RPM. If HDD 200 is spun down, method 500 may proceed to step 526 and method 500 may direct HDD 200 to spin up to the target RPM. If HDD 200 is spinning at the target RPM or may be in the process of spinning up to the target RPM, method 500 may proceed to step 528.

At step 528, method 500 may initiate an artificial seek. As discussed with respect to FIG. 3, the seek method may be random, butterfly, sequential, a ⅓ stroke seek, or any other suitable seeking method. After step 528, method 500 may proceed to step 530 where method 500 may wait a pre-determined interval. The interval may be preset by the manufacturer or may be selected or preset by a user or administrator. The interval time may be on the order of approximately 60 seconds or any suitable time. After waiting the interval time, method 500 may return to step 504 and method 500 may determine if HDD 200 is powered on.

Returning to step 520, if the current temperature reading is not a first reading, e.g., the reading may be a second or subsequent reading, then method 500 may proceed to step 532. At step 532, method 500 may determine if the current temperature is higher than the previous temperature reading. If the current temperature is higher, method 500 may proceed to step 530. If the current temperature is the same or lower than a previous temperature, method 500 may proceed to step 534.

At step 534, method 500 may indicate that the ambient air temperature in the data center may need to be raised. For example, if after executing an artificial seek that includes operating the SPM, operating VCM 238, and/or operating another heat producing component, HDD 200 temperature fails to rise, the data center temperature may be excessively low. After step 534, method 500 may proceed to step 530.

Modifications, additions, or omissions may be made to method 500 without departing from the scope of the present disclosure. For example, the order of the steps may be performed in a different manner than that described and some steps may be performed at the same time. For example, step 528 and step 530 may be performed simultaneously. Additionally, each individual step may include additional steps without departing from the scope of the present disclosure. For example, step 524 may be preformed before or after step 520 without departing from the scope of the present disclosure.

Figure 6:
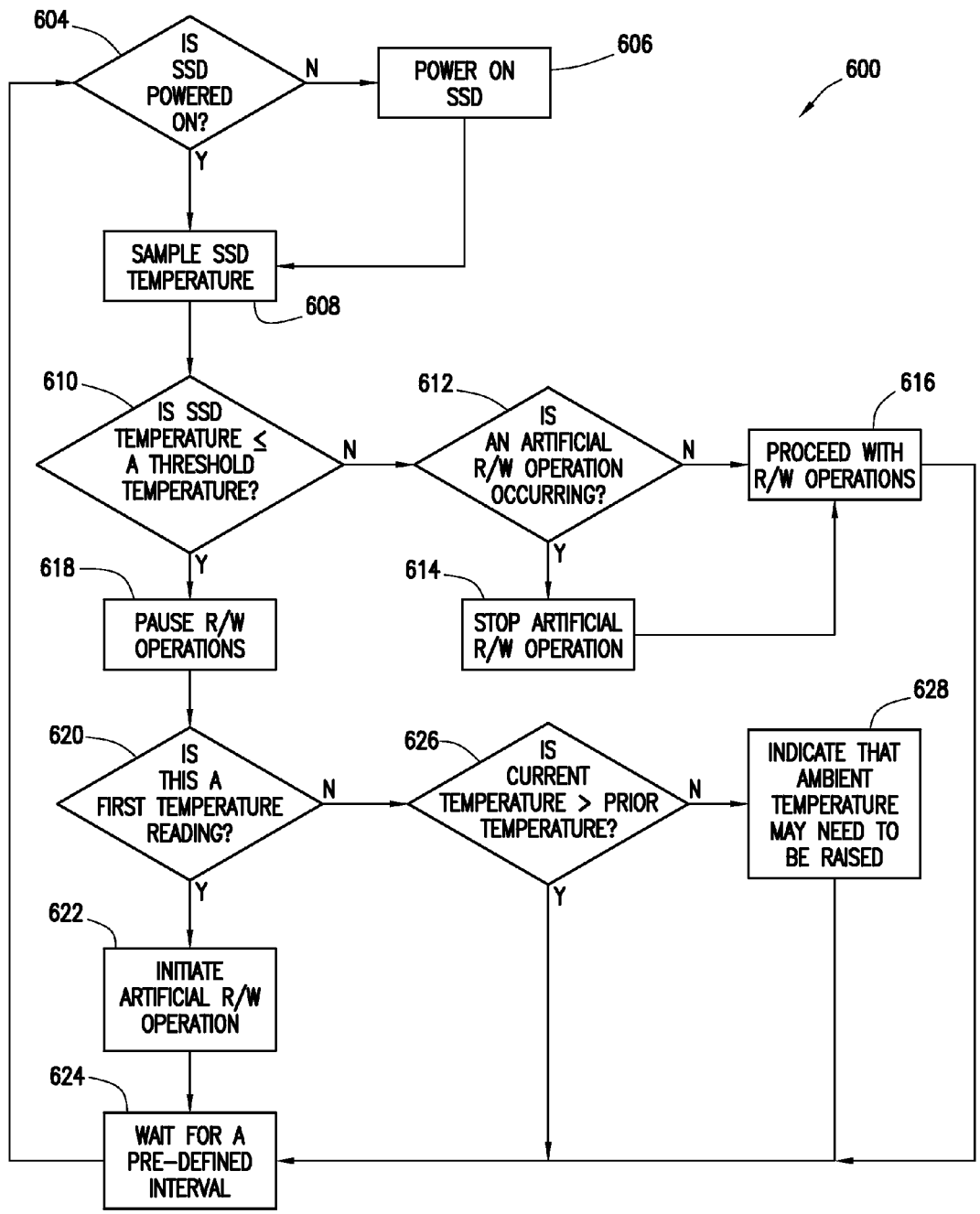
FIG. 6 illustrates a flow chart for an example method for protecting data to be read from or written to a SSD during cold excursions, in accordance with certain embodiments of the present disclosure.

FIG. 6 illustrates a flow chart for an example method 600 for protecting data to be read from or written to a SSD during cold excursions, in accordance with certain embodiments of the present disclosure. The steps of method 600 may be performed by various computer programs, models or any combination thereof. The programs and models may include instructions stored on a computer-readable medium and operable to perform, when executed, one or more of the steps described below. The computer-readable media may include any system, apparatus or device configured to store and/or retrieve programs or instructions such as a microprocessor, a memory, a disk controller, a compact disc, flash memory or any other suitable device. The programs and models may be configured to direct a processor or other suitable unit to retrieve and/or execute the instructions from the computer readable media. For example, method 600 may be executed by processor 102, a controller, a user, and/or other suitable source. For illustrative purposes, method 600 may be described with respect to an example SSD; however, method 600 may be used to protect data to be read from or written to any suitable SSD.

Although FIG. 6 discloses a particular number of steps to be taken with respect to method 600, method 600 may be executed with greater or lesser steps than those depicted in FIG. 6. In addition, although FIG. 6 discloses a certain order of steps to be taken with respect to method 600, the steps comprising method 600 may be completed in any suitable order.

At step 604, method 600 may determine if a SSD is powered on. If the SSD is not powered on, the method may proceed to step 606 where power may be provided to the SSD. If, or once, the SSD may be powered on, method 600 may proceed to step 608.

At step 608, method 600 may sample the SSD temperature. A thermistor, sensor, or other suitable temperature measuring unit located on or near the SSD may determine and report the temperature. The temperature may be sampled automatically according to a schedule as described in more detail above with reference to FIGS. 1-4. Additionally, a user, administrator, manufacturer, and/or other suitable individual may utilize a user interface, such as user interface 102, to initiate a manual sampling of the SSD temperature. After sampling the temperature, method 600 may proceed to step 610.

At step 610, method 600 may make a determination whether the sampled SSD temperature is at or above a threshold temperature. The threshold temperature may be based on a design rating for the SSD and/or it may be user defined. If the SSD sampled temperature is at or above the threshold temperature, method 600 may proceed to step 612. If the SSD sampled temperature is below the threshold temperature, then method 600 may proceed to step 618.

At step 612, method 600 may determine if an artificial R/W operation is occurring in the SSD. Discussed in more detail below, an artificial R/W operation may have been initiated to heat up the SSD. If an artificial R/W operation is occurring, it may be stopped at step 614. If an artificial R/W operation is not occurring or the artificial R/W operation is stopped at step 614, then method 600 may proceed to step 616.

At step 616, method 600 may instruct the SSD to proceed with standard R/W operations such that data may be read from and written to memory of the SSD in normal operation. Following step 616, method 600 may proceed to step 624.

If, at step 610, the SSD temperature is below a threshold temperature, method 600 may proceed to step 618. At step 618, method 600 may pause or suspend R/W operations that may be processed by the SSD. The pausing of R/W operations may occur to protect data to be read from or written to the SSD from being corrupted or rendered unreliable. After step 618, method 600 may proceed to step 620.

At step 620, method 600 may determine if the current temperature reading may be a first temperature reading. For example, whether the temperature from the thermistor, sensor, or other suitable temperature measuring unit placed on or near the SSD was sampled for the first time. If the current temperature reading is the first reading, method 600 may proceed to step 622. If the current temperature reading is not a first reading, e.g., as second or subsequent reading, then method 600 may proceed to step 626.

At step 622, method 600 may initiate "dummy" SSD controller transactions, an artificial R/W operation, and/or other activity that may produce heat from the SSD. As discussed above with reference to FIGS. 1 and 3, the artificial R/W operation may be random reading, sequential writing, and/or any other suitable artificial R/W operation. After step 622, method 600 may proceed to step 624 where method 600 may wait a pre-defined interval. The interval may be preset by the manufacturer or may be selected or preset by a user or administrator. The interval time may be on the order of approximately 60 seconds or any suitable time. After waiting the interval time, method 600 may return to step 604 and method 600 may determine if the SSD is powered on.

Returning to step 620, if the current temperature reading is not a first reading, e.g., the reading may be a second or subsequent reading, then method 600 may proceed to step 626. At step 626, method 600 may determine if the current temperature is higher than the previous temperature reading. If the current temperature is higher, method 600 may proceed to step 624. If the current temperature is the same or lower than a previous temperature, method 600 may proceed to step 628.

At step 628, method 600 may indicate that the ambient air temperature in the data center may need to be raised. For example, if after executing an artificial R/W operation that includes operating the SSD fails to raise the temperature proximate the SSD, then the data center temperature may be excessively low. After step 628, method 600 may proceed to step 624.

Modifications, additions, or omissions may be made to method 600 without departing from the scope of the present disclosure. For example, the order of the steps may be performed in a different manner than that described and some steps may be performed at the same time. For example, step 622 and step 624 may be performed simultaneously. Additionally, each individual step may include additional steps without departing from the scope of the present disclosure. For example, step 618 may be performed before or after step 620 without departing from the scope of the present disclosure.

Although the present invention and its advantages have been described in detail, it should be understood that various changes, substitutions and alternations can be made herein without departing from the spirit and scope of the invention as defined by the following claims.

What is claimed is:

1. A method for preventing unreliable data operations at cold temperatures comprising:
   determining whether a first internal temperature of a hard disk drive (HDD) is below a threshold temperature, the HDD communicatively coupled to an information handling system; and
   issuing a read command from the information handling system if the first internal temperature is below the threshold temperature, the read command requesting that data be read from a track of the HDD;
   disregarding the data returned from the HDD based on the read command so that the data is not read by the information handling system.

2. The method of claim 1, further comprising sampling a second internal temperature of the HDD following a pre-defined time interval.

3. The method of claim 2, further comprising pausing a read/write operation if the second internal temperature of the HDD is below the threshold temperature.

4. The method of claim 3, further comprising proceeding with resuming the read/write operation if the second internal temperature of the HDD is above the threshold temperature.

5. The method of claim 2, wherein the pre-defined time interval is substantially based on an event.

6. The method of claim 2, wherein the pre-defined time interval is provided by a user.

7. The method of claim 1, further comprising spinning the HDD up to a target revolutions per minute (RPM).

8. The method of claim 1, wherein the read command causes one of a random seek, a butterfly seek, a ⅓ stroke seek, and a sequential seek.

9. The method of claim 1, wherein the threshold temperature is provided by a user.

10. A hard disk drive (HDD) comprising:
    a temperature sensor configured to transmit a signal corresponding to a first internal temperature; and
    a component configured to:
    initiate a read from a track of the HDD in response to a read command from an information handling system communicatively coupled to the HDD if the signal indicates that the first internal temperature is below a threshold temperature; and
    disregard the data returned from the HDD based on the read command so that the data is not read by the information handling system.

11. The HDD of claim 10, wherein the temperature sensor is further configured to transmit a second internal temperature following a pre-defined time interval.

12. The HDD of claim 11, further comprising a second component configured to pause a read/write operation if the second internal temperature of the HDD is below the threshold temperature.

13. The HDD of claim 12, wherein the second component is further configured to proceed with the read/write operation if the second internal temperature of the HDD is above the threshold temperature.

14. The HDD of claim 11, wherein the pre-defined time interval is substantially based on an event.

15. The HDD of claim 11, wherein the pre-defined time interval is provided by a user.

16. The HDD of claim 10, further comprising a third component configured to spin the HDD up to a target revolutions per minute (RPM).

17. The HDD of claim 10, wherein the read command causes one of a random seek, a butterfly seek, a ⅓ stroke seek, and a sequential seek.

18. The HDD of claim 10, wherein the threshold temperature is provided by a user.

19. An information handling system comprising:
a processor;
a hard disk drive (HDD) communicatively coupled to the processor; and
a computer-readable medium communicatively coupled to the processor and having stored thereon instructions configured to, when executed by the processor:
determine whether a first internal temperature of the HDD is below a threshold temperature;
issue a read command requesting that data be read from a track of the HDD if the first internal temperature is below the threshold temperature; and
disregard the data returned from the HDD based on the read command so that the data is not read.

20. The system of claim 19, wherein the instructions are further configured to sample a second internal temperature of the HDD following a pre-defined time interval.

21. The system of claim 20, wherein the instructions are further configured to pause a read/write operation if the second internal temperature of the HDD is below the threshold temperature.

22. The system of claim 21, wherein the instructions are further configured to proceed with the read/write operation if the second internal temperature of the HDD is above the threshold temperature.

23. The system of claim 20, wherein the pre-defined time interval is substantially based on an event.

24. The system of claim 20, wherein the pre-defined time interval is provided by a user.

25. The system of claim 19, wherein the instructions are further configured to spin the HDD up to a target revolutions per minute (RPM).

26. The system of claim 19, wherein the read command causes one of a random seek, a butterfly seek, a ⅓ stroke seek, and a sequential seek.

27. The system of claim 19, wherein the threshold temperature is provided by a user.

* * * * *